United States Patent

Song et al.

Patent Number: 5,416,175
Date of Patent: May 16, 1995

[54] METHOD FOR REDUCING SHEETING DURING POLYMERIZATION OF α-OLEFINS

[75] Inventors: Gyung-Ho Song, Charleston; Fathi D. Hussein, Cross Lanes; Kiu H. Lee, S. Charleston; Henry B. Hinckley, Charleston, all of W. Va.

[73] Assignee: Union Carbide Chemicals & Plastics Technology Corporation, Danbury, Conn.

[21] Appl. No.: 170,003

[22] Filed: Dec. 17, 1993

[51] Int. Cl.$^6$ ................................................ C08F 2/34
[52] U.S. Cl. .......................................... 526/74; 526/88
[58] Field of Search ............................ 526/62, 74, 88

[56] References Cited

U.S. PATENT DOCUMENTS

| | | | |
|---|---|---|---|
| 4,532,311 | 7/1985 | Fulks et al. | 526/62 |
| 4,792,592 | 12/1988 | Fulks et al. | 526/62 |
| 4,803,251 | 2/1989 | Goode et al. | 526/62 |
| 4,855,370 | 8/1989 | Chirillo et al. | 526/74 |
| 4,876,320 | 10/1989 | Fulks et al. | 526/62 |
| 4,956,427 | 9/1990 | Jenkins, III et al. | 526/62 |
| 4,994,534 | 2/1991 | Rhee et al. | 526/88 |
| 5,034,479 | 7/1991 | Eisinger et al. | 526/68 |

*Primary Examiner*—Joseph L. Schofer
*Assistant Examiner*—Tom Weber
*Attorney, Agent, or Firm*—P. W. Leuzzi

[57] ABSTRACT

A method for reducing sheeting during polymerization of alpha-olefins in a fluidized bed employing catalysts prone to cause sheeting which comprises feeding a material carrying a static electric charge opposite to the static charge in said bed, said opposite charge of said material being generated by passing said material in contact with a surface adapted to impart said static electric charge to said material opposite the charge existing in said bed.

8 Claims, No Drawings

METHOD FOR REDUCING SHEETING DURING POLYMERIZATION OF α-OLEFINS

BACKGROUND OF THE INVENTION

1. Field of the Invention

This invention relates to a method for reducing sheeting during polymerization of alpha olefins and more particularly to a method for reducing sheeting during polymerization of polyethylene.

2. Summary of the Prior Art

Conventional low density polyethylene has been historically polymerized in heavy walled autoclaves or tubular reactors at pressures as high as 50,000 psi and temperatures up to 300° C. or higher. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

More recently, technology has been provided whereby low density polyethylene can be produced by fluidized bed techniques at low pressures and temperatures by copolymerizing ethylene with various alpha-olefins. These low pressure LDPE (LP-LDPE) resins generally possess little, if any, long chain branching and are sometimes referred to as linear LDPE resins. They are short chain branched with branch length and frequency controlled by the type and amount of comonomer used during polymerization.

As is well known to those skilled in the art, low pressure, high or low density polyethylenes can now be conventionally provided by a fluidized bed process utilizing several families of catalysts to produce a full range of low density and high density products. The appropriate selection of catalysts to be utilized depends in part upon the type of end product desired, i.e., high density, low density, extrusion grade, film grade resins and other criteria.

The various types of catalysts that can be employed to produce polyethylene in fluid bed reactors are generally disclosed in U.S. Pat. Nos. 4,855,370; 4,803,251; 4,792,592; 4,532,311; and 4,876,320.

Also disclosed in said patents is the incidence of "sheeting" in the reaction system when certain of the catalysts are utilized.

A strong correlation exists between sheeting and the presence of excess negative or positive static charges. This is evidenced by sudden changes in static levels followed closely by deviation in temperatures at the reactor wall whereby catalyst and resin particles adhere to the reactor walls due to static forces. If allowed to reside long enough under a reactive environment, excess temperatures can result in particle fusion. These temperature deviations are either high or low. Low temperatures indicate particle adhesion causing an insulating effect from the bed temperature. High deviations indicate reaction taking place in zones of limited heat transfer. Following this, disruption in fluidization patterns is generally evident, catalyst feed interruption can occur, product discharge system pluggage results, and thin fused agglomerates (sheets, regardless whether they come loose from reactor walls) are noticed in the granular product. The critical static voltage level for sheet formation is a complex function of resin sintering temperature, operating temperature, drag forces in the fluid bed, catalyst activation energy, resin particle size distribution and recycle gas composition.

Numerous causes for static charge exist. Among them are generation due to frictional electrification (triboelectrification) of dissimilar materials, limited static dissipation, introduction to the process of minute quantities of prostatic agents, excessive catalyst activities, etc.

It is generally believed that when the charge on the particles reaches the level where the electrostatic forces trying to hold the charged particle near the reactor wall exceed the drag forces in the bed trying to move the particle away from the wall, a layer of catalyst-containing polymerizing resin particles forms a non-fluidized layer near the reactor wall. Heat removal from this layer is not sufficient to remove the heat of polymerization because the non-fluidized layer near the wall has less contact with the fluidizing gas than do particles in the fluidized portion of the bed. The heat of polymerization increases the temperature of the non-fluidized layer near the reactor wall until the particles melt and fuse. At this point other particles from the fluidized bed will stick to the fused layer and it will grow in size until it comes loose from the reactor wall. The separation of a dielectric from a conductor (the sheet from the reactor wall) is known to generate additional static electricity thus accelerating subsequent sheet formation.

The above patents also disclose the methods and techniques for substantially reducing the incidence of sheeting in the reaction system. Thus, U.S. Pat. No. 4,876,320 discloses a method for polymerization of one or more alpha-olefins in a fluidized bed reactor in the presence of a catalyst prone to cause sheeting wherein the static electric charges in the reactor at the site of possible sheet formation is maintained below static voltage levels which could otherwise cause sheet formation.

U.S. Pat. No. 4,792,592 maintains static electric charges in the reactor below sheeting levels by creating areas of localized field strength within the reactor for the promotion of electrical discharge to ground.

U.S. Pat. No. 4,803,251 utilizes a chemical additive which generates either a positive or negative charge responsive to particular static levels in the reactor.

U.S. Pat. No. 4,532,311 teaches the introduction of a chromium containing compound into the reactor in such a manner as to contact the surfaces of the reactor in order to reduce the incidence of sheeting.

The present invention provides an alternate and preferred method for reducing the incidence of sheeting during the fluidized bed polymerization of alpha-olefins which employ catalysts prone to cause sheeting.

SUMMARY OF THE INVENTION

Broadly contemplated, the present invention provides a method for reducing sheeting during polymerization of alpha-olefins in a fluidized bed employing catalysts prone to cause sheeting which comprises feeding a material carrying a static electric charge opposite to the static charge in said bed, said opposite charge of said material being generated by passing said material in contact with a surface adapted to impart said static electric charge to said material opposite the charge existing in said bed.

In one aspect of the invention, the surface which imparts a charge to the material opposite to the charge existing in the fluidized bed is contained in a spray gun, preferably a powdered spray gun through which material in the form of particles receiving the appropriate charge are directed into the reaction system.

In another aspect of the invention, the surface is contained in one or more tubes, strategically positioned to permit passage of the appropriate charged particles into the reaction system.

Other aspects and objects of the invention will become apparent from the following description of the invention.

DETAILED DESCRIPTION OF THE INVENTION

Although the process can be practiced in any polymerization system which experiences agglomeration of polymers, the process is preferably applicable for preventing agglomeration of polymers in a fluidized bed reactor.

The fluidized bed reactor can be of the type described in U.S. Pat. Nos. 4,558,790 and 4,876,320, the teachings of which are incorporated herein by reference. Other types of conventional reactors for the gas phase production of, for example, polyethylene or ethylene copolymers and terpolymers can also be employed. At the start up, the bed is usually made up of polyethylene ganular resin. During the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. The fluidizing gas can also be a halogen or other gas. A typical cycle gas is comprised of ethylene, nitrogen, hydrogen, propylene, butene, or hexene monomers, diene monomers, either alone or in combination.

The materials which can be employed according to the present invention depend upon the type reaction system, temperature employed, and other variables. As is know, and in general, when two dissimilar materials are brought into contact or collide and separate, charge transfer from one of the materials to the other takes place. The charge transfer process between metals is explained in terms of electron transfer due to the difference in work function between the metals; however, charge transfer of insulator/metal contacts and insulator/insulator contacts is far from completely understood for different reasons.

At the point of contact, the equilibrium condition requires that their chemical potentials (Fermi levels) equalize. Upon transfer of electrons or ions through the contact areas, the one having a higher Fermi level acquires a positive charge and leaves the other with a negative charge. The electrostatic charge (number and direction of electrons) acquired by flowing particles depends upon numerous variables: bulk chemical composition of bodies, the characteristics of both surfaces in contact (composition, moisture, roughness), molecular structure, size and shape, state of electric charge before contact, temperature, atmosphere (composition, pressure, humidity), electromagnetic fields, type of contact (touching, impaction, rubbing), orientation of bodies during contact, area and duration of contact, relative velocity of bodies, and force between bodies.

With some exceptions, many polymers charge negatively when contacted by metals. It has been stated that, according to the triboelectrification series of materials and their permitivities (farad/meter), materials low in the series, having low values of permitivity (~2), charge negatively when contacted with materials higher in the series whereas polymers on the top of the list of permitivity (~4) tend to charge positively because of the presence of electron donating groups. The triboelectrification series of polymeric materials as disclosed by Stolka, M., "Hard Copy Materials," Chemtech, 487–495, August (1989) is indicated below.

| | |
|---|---|
| Positive | Nylon |
| | Polymethyl methacrylate |
| | (carrier cores - iron, ferrite) |
| | Styrene butylmethacrylate copolymer |
| | Polyesters |
| | Polyacrylonitrile |
| | (carbon black) |
| | Polycarbonate |
| | Polystyrene |
| Positive | Nylon |
| | Polyethylene |
| | Polypropylene |
| | Polytetrafluoroethylene (Teflon ®) |
| Negative | Halogenated polymers |

Upon transfer of electrons through contact areas between materials in high level and in low level, one in high level acquires a positive charge and leaves the other with a negative charge; e.g., rubbing a polyethylene particle on a polytetrafluoroethylene wall would leave the polyethylene particle with a positive charge and the polytetrafluoroethylene wall with a negative charge.

Thus, depending on the type static charges existing in the fluidized bed, appropriate selection of material contacting surfaces prior to the entry into the bed would ultimately result in neutralization of static charges in the bed thereby controlling sheeting incidents.

It has been found that various techniques can be employed for feeding the oppositely charged materials to the fluidized bed. Thus, the triboelectrically charged particles can be added to the reactor utilizing the recycle gas. In another technique, the triboelectrically charged particles are added to the reactor utilizing separate feeders. In still another technique, triboelectrically charged particles can be added to the reactor utilizing particles from the fluidized bed.

When the recycle gas is utilized for introducing triboelectrically charged particles to the reactor, the recycle gas stream is preferably one which contains a large amount of fines. The recycle gas in the reaction scheme is directed through a charging device which contain either positive or negative generating surfaces. These charging devices can be in the form of powder spray guns and tubes that generate either positive or negative charges on particles. Representative of the type of spray guns which can be employed are those available from Nordson Corporation under the trademark Tribomatic ®. The charging devices are preferably positioned with respect to the reactor in a manner such that the recycle gas is directed to either a positive generating charge device or negative generating charge device in the recycle line whereby the appropriate charge is imparted to the material (in this case, fines) entering the reactor with the recycle gas. A system of bypass lines and valves can be utilized for selectively directing the recycle gas into the charging devices prior to entry into the reactor.

In another technique, the electrically charged particles can be added to the reactor utilizing a separate feeder(s). The material in the form of particles to be charged can be contained in a storage tank which is in communication with the appropriate charging devices. Again, the device can be of any previously described type which is capable of imparting a positive or negative charge to the particle in contact with the charging surface of the device. Advantageously, the particles can be directed through the device and into the reactor with the aid of the fluidizing gas which is directed through the appropriate devices by means of conventional valves and bypass lines. This technique is desirable for introducing fluidization aids, catalyst and other additives to the reactors which have received a charge according to the present invention.

In still another technique for practicing the invention, entrained fines from the expanded section of the reactor are fed through to the appropriate charging devices with, if necessary, the aid of a compressor and the appropriately charged particles are thereafter introduced into the reaction system responsive to the amount and type of static charges in the reactor.

The materials which can be introduced into the reaction system are those which are capable of receiving the desired charge and which do not substantially interfere with the reaction taking place. The materials are preferably in particle or powder form and can include for example, inorganic oxide powders, such as oxides, fluorides, or sulfides of various metal elements. For example, basic oxides, such as MgO, ZNo and $AL_2O_3$ have positive charging tendencies and acidic oxides, such as $SiO_2$, $TiO_2$ and $Nb_2O_5$ have negative charging tendencies.

In addition, appropriate materials can include ethylene, homopolymers and copolymers, polypropylene homopolymers, polypropylene random and impact copolymers, EDPM, EPM and like materials.

As mentioned previously, the materials can be preferably added in particle or powder form and should be of a particle or powder size of about 0.001" to 0.1", preferably about 0.01" to 0.04".

The surface which is provided in the charging device depends upon the material to which the appropriate charge is to be imparted. The type surface can be fabricated from any of the polymeric materials mentioned previously in the triboelectrification series of polymeric materials. The surfaces can include stainless steel, glass, nylon and the like.

The following Examples will illustrate the invention. For the Examples, the following was utilized:

An electrostatic charging measurement unit, a cold model fluidized bed containing polyethylene resin and a pilot plant reactor producing colorable sticky ethylene propylene rubber resin (EPR).

A simple test unit was prepared to measure static generation of polyethylene, polypropylene particles and silica powder passing through Teflon ®, nylon and stainless steel tubes. The polyolefin particles were filled in a 1000 cc bomb that was subsequently pressurized up to 50 psig by plant nitrogen to feed the particles through the tubes. Due to the pressure drop between the bomb and the atmospheric pressure measurement chamber, the particles were successfully sprayed with a very high speed. A static ball probe connected to a computer and a chart recorder was used to measure the static electricity charged on the sprayed particles.

A fluidized bed system instrumented to measure static potentials and pressure drops and to control gas velocity and bed temperature was used to study electrostatic phenomena. The system was composed of a fluidized bed, a heater and a nitrogen gas feed system with motor, valves and flow transmitters. The fluidized bed made of Plexiglas ® columns was 5.5 inch in diameter and 8 ft. in length. A distributor plate fabricated from a stainless steel plate had 6 holes with semicircular caps covering the holes to prevent particles from falling down through the holes. Seven nozzles for static probes were located along the opposite side of the cylindrical column, i.e., 3", 6", 9", 12", 15", 18" and 21" from the distributor plate. To simulate reactor conditions, an aluminum liner was placed into the Plexiglas ® column to make the inside surface conductive and was grounded with an earthed wire.

Plant nitrogen (i.e. unpurified, 150 psig) was used to fluidize particles and the superficial gas velocity was automatically controlled or regulated by flow transducers and a computer (Honeywell). The bed temperature was measured by a thermocouple and controlled by motor-valves with a heater which was also controlled by a computer. Experimental conditions for the electrostatic measurements were: Bed Temperature: 20°–80° C.; Gas Medium: Nitrogen; Superficial Gas Velocity: 0.4–2.0 ft/s; and Bed Weight: 3000–3800 gm.

The electrostatic probes were used to measure the static electricity in the fluidized bed and were designed for temporary installation on the column through nozzles. The probe electronics function as a 4 to 20 mA two-wire transmitter, permitting standard connection to the computer and recorders. The static probe used in the Examples included a steel rod covered with a Teflon ® sleeve and a hemispherical tip.

For the pilot plant reactor tests, EPR polymer was produced continuously in a gas-phase fluidized bed reactor. The catalyst was vanadium-based and was supported on silica particles. The catalyst system included a cocatalyst such as tri-isobutyl aluminum and a promoter such as chloroform. The reactor was carried out in a fluidized bed reactor similar to the one shown in FIG. 1 of U.S. Pat. No. 4,994,534. Ethylene, hydrogen, and comonomers (combinations of propylene and diene)were continuously fed to the reactor. A fluidization aid such as calcined silica (calcined to remove chemically bound water and minimize the level of the hydroxyl groups) was also used. The calcined silica was fed to the reactor at short intervals to keep an acceptable concentration level of silica in the reactor to prevent defluidization or agglomeration.

Example 1 demonstrates the positive static charging of polypropylene and polyethylene fines which are directed through a charging device having a "Teflon ®" surface.

EXAMPLE 1

Static generation of polypropylene and polyethylene particles flowing through a Teflon ® tube was measured using the electrostatic charging measurement unit. The flow of polypropylene fine particles through a ⅜" Teflon ® tube consistently generated very high positive static electricity. When the polypropylene fine particles was fed through the Teflon ® tube under a differential pressure drop of 40 psi, positive static electricity of greater than +2000 Volt was measured.

When the same Teflon® tube was used to feed the polyethylene particles, positive static was also detected with a maximum value of +2000 Volt, but the magnitude of the static was less than that of polypropylene fines.

Example 2 demonstrates the negative static charging of polypropylene and polyethylene fines which are directed to a charging device having a Nylon surface.

EXAMPLE 2

When the polypropylene fine particles were sprayed by nitrogen gas under a differential pressure of 40 psig through a nylon tube (⅜" o.d.), negative static charging on the particle surface was achieved. The flow of the polyethylene particles through the nylon tube under a differential pressure of 40 psi generated negative static electricity of −600 Volt. At the beginning, positive spike was sometimes detected and, after a while, very high negative static was maintained until the particles in the feeding bomb was emptied.

Example 3 is similar to Example 2, except that stainless steel tubes were utilized to negatively charge the polypropylene particles.

EXAMPLE 3

A stainless steel tube (⅜: o.d.) negatively charged the polypropylene particles even greater than the nylon tube. When the polypropylene particles were fed through the stainless steel tube induced by a differential pressure drop of 40 psi, the flow of the particles generated very high negative static electricity with maximum value of −2000 Volt.

This Example 4 demonstrates the present invention wherein both negative and positive static electricity was neutralized by a "Teflon ®" tube in a fluidized bed.

EXAMPLE 4

In order to neutralize both negative and positive static electricity in a cold model fluidized bed, the polyolefin particles were sprayed through Teflon®, nylon or stainless steel tubes into the fluidized bed depending upon the polarity of the static in the bed.

When the polyethylene and polypropylene particles were sprayed directly into the fluidized bed through a ⅜" Teflon ®, tube, the sprayed particles were triboelectrically charged and changed polarity of the static in the fluidized bed.

Negative static of −50 Volt was changed to positive static of +50 Volt. When polypropylene particles were used using the same Teflon ® tube, negative static was also changed to positive static.

In a different run, negatively charged fluidized beds were neutralized by positively charged particles directed through the Teflon ® tube under the same previously described conditions.

EXAMPLE 5

This example demonstrates positive static neutralization by using a nylon tube leading directly to a fluidized bed reactor. The procedure was similar to Example 4.

Positive static electricity in the fluidized bed was effectively neutralized by the negatively charged PE & PP (independently) particles through nylon tubes of ⅜" o.d. and ½" o.d. When a polyethylene nylon tube of ½" o.d. was used, positive static of +400 Volt was reduced to +130 Volt. When polypropylene particles were charged and sprayed into the fluidized bed, static neutralization was easily achieved by continuously adding the negatively charged particles.

EXAMPLE 6

This Example demonstrates positive static neutralization when employing a stainless steel tube leading directly to a fluidized bed.

The procedure was similar to Examples 4 and 5.

Stainless steel tubes of ⅜" o.d. and ½" o.d. were also tested to charge polypropylene and polyethylene particles and to neutralize static electricity in a fluidized bed charged by silica powder. As soon as polypropylene fines were slowly added through the ⅜" stainless steel tube to the fluidized bed, very high negative static was detected until a regulating valve was shut off. When the valve was shut off, the negative static signal was changed to a negligible positive static. It was found that the static response was reproducible when the valve was opened after 15 minutes to confirm the previous results.

EXAMPLE 7

This Example demonstrates static charge generation by utilizing Triboelectric spray guns leading into a fluidized bed reactor.

Triboelectric Teflon® and nylon charge guns, Tribomatic® spray guns manufactured by Nordson Corp., were used to generate static charges on polyolefin particles.

Static charge generation by triboelectric Teflon® and nylon charge guns were measured by static ball probes in a cold model fluidized bed containing coarse polyethylene particles. Polyethylene fines were sprayed into the bed through a nozzle located at 3 inches above the distributor plate. When the resin particles were sprayed into the bed by the Teflon ® spray gun, positive static electricity of +200 Volts was measured. On the other hand, the static electricity of the bed went to −500 Volts when the nylon charge gun was put in service.

EXAMPLE 8

This Example demonstrates static neutralization by employing spray guns in a cold model fluidized bed.

Silica was injected into the cold model fluidized bed to generate static electricity. In general, the Teflon® spray gun and the nylon spray gun generated positive static and negative static, respectively, in the fluidized bed containing the silica powder.

At the beginning of the test, positive static and negative static were measured at the bottom and at the top of the fluidized bed, respectively, after putting in 10 wt % of silica by total bed weight into the top of the bed. In order to neutralize the static in the fluidized bed, the nylon powder spray gun was turned on, which in turn reduced the positive static at the bottom of the bed from +1000 Volt to +250 Volt.

For the static neutralization of negative static, the Teflon ® powder spray gun was tested in a cold model fluidized bed containing very low density polyethylene resin. To generate negative static, a mixture of 90 wt % silica and 10 wt % magnesium oxide powder was prepared and injected through a Teflon ® tube. When the mixture was injected, negative static of −1000 Volt was measured. To be more effective, polypropylene fine particles were sprayed into the negatively charged fluidized bed. As soon as the positively charged particles were sprayed through the Teflon ® tube, the very high negative static was virtually neutralized to zero static. Once the spray gun was turned off, after a couple of minutes, the static stated to show negative signals. Again, the Teflon ® spray gun was applied. The negative static was neutralized again accordingly. When the spray gun was turned off, the neutral static slowly returned to negative static due to the presence of silica and magnesium oxide powders in the fluidized bed.

The Teflon ® powder spray gun was used to neutralize negative static generated by 10 wt % of flour in a cold model fluidized bed. When the flour was injected into the bed, negative static of −300 Volt was measured. To neutralize the negative static, polypropylene fine particles were sprayed into the bed by the Teflon ® charge gun. The negative static was completely neutralized by regulating the positive charged particles flow rate.

EXAMPLE 9

This example demonstrates the invention in a gas phase fluidized bed polymerization reaction vessel.

In this example, reactor operation was established using a 120 g/g prepolymerized catalyst (no flow, 10% C3), under ethylene propylene monomer (EPM) conditions: $C_3/C_2=0.4$, $H_2/C_2=0.00\ 1$, $C_2PP=90$ psi). The reactor was operated initially by using carbon black as a fluidization aid. When the reaction was well established, the level of carbon black was reduced and calcined silica was introduced as a fluidization aid while carbon was periodically fed when static level increased above −600 to −700 Volts. Each shot of silica during this operation increased the negative static level.

A Teflon ® coiled tube of ⅛" o.d. placed inside ⅝" stainless steel tube was prepared to feed silica and to reduce the negative static generation of silica, i.e. Ultrasil ®. Using the Teflon ® coiled tube, the negative static generation due to silica in the reactor was significantly reduce. When the Teflon ® lined coil was in service, the reactor was held at a slightly positive static level of 200–300 Volts although negative static spikes were observed whenever silica was injected to the reactor. The amplitude of the negative static spikes was as large as −800 Volts.

In addition, a Teflon ® coiled tube with the same dimension and geometry as the one used on the silica feed line was used on the prepolymerized catalyst feed line. It was observed that the Teflon ® coiled tube generated positive static on prepolymer particles when they were fed through the coil. Since then, the reactor operated smoothly without a need for carbon feed and with static under control for more than three days finally making colorable EPM products.

In the end, colorable EPM with and without silica (2-3 wt % Ultrasil ®) was successfully produced in the reactor by controlling static activity of the reactor. Negative static generated by both a silica and the prepolymer catalyst was controlled by applying different antistatic techniques. Specifically, the use of surface modifications to the feed lines for both prepolymer and the fluidization aid was particularly effective in reducing the negative static generated by the silica particles. The most effective combination of feed line configurations was Teflon ® lined stainless steel coil for feeding silica.

EXAMPLE 10

This Example is similar to Example 9 except that a polyethylene line was employed instead of the Teflon ® line.

A ⅜" o.d. carbon impregnated polyethylene was placed inside a section of ½" stainless steel tubing to study the effect of this lining on reactor static activity. When the stainless steel tube was replaced by the polyethylene lined tube, negative static spike height occurring during silica injection was reduced from −800 Volts to −200 Volts.

EXAMPLE 11

This example is similar to Example 9 except that a portion of the stainless steel line was replaced by a Teflon ® tube.

The reactor started under similar conditions as Example 9 using T-1 catalyst and TIBA/Chloroform catalyst system. Calcined silica was used as a white fluidization aid and, as a result, high level of negative static potential was generated due to conveying the silica through a stainless steel tube that extended from the feeder to the reactor. Replacement of a portion of the transfer line (about 15%) with a Teflon ® coated tube, resulted in driving the static potential slightly positive.

We claim:

1. A method for reducing sheeting during polymerization of alpha-olefins in a fluidized bed employing catalysts prone to cause sheeting which comprises feeding an inert material in particle or powder form carrying a static electric charge opposite to the static charge in said bed, said opposite charge of said material being generated by passing said material in contact with a surface adapted to impart said static electric charge to said material opposite the charge existing in said bed wherein said material is capable of acting as a fluidization aid.

2. A method according to claim 1 wherein said surface which imparts a static electric charge to said material opposite the charge existing in said bed is contained in a spray gun.

3. A method according to claim 1 wherein said surface which imparts a static electric charge to said material opposite the charge existing in one or more tubes which permits passage of appropriately charged particles into said fluidized bed.

4. A method according to claim 1 wherein said materials are in powder form of a particle size of about 0.001" to about 0.1".

5. A method according to claim 1 wherein said materials are inorganic oxide powders.

6. A method according to claim 1 wherein said materials are ethylene homopolymers and copolymers, or polypropylene homopolymers, or polypropylene random and impact copolymers.

7. A method according to claim 1 wherein said material is introduced into said fluidized bed through a gas stream recycle line.

8. A method according to claim 1 wherein said material is introduced into said fluidized bed through separate feeders associated with the reaction system.

* * * * *